United States Patent
Chen et al.

(10) Patent No.: US 10,666,715 B2
(45) Date of Patent: May 26, 2020

(54) INCIDENT MANAGEMENT FOR COMPLEX INFORMATION TECHNOLOGY PLATFORMS

(71) Applicant: International Business Machines Corporation, Armonk, NY (US)

(72) Inventors: Xiao Ling Chen, Beijing (CN); Xue Feng Gao, Beijing (CN); Fei Li, Beijing (CN); Ren Yi Ruan, Beijing (CN); Qing Feng Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 15/589,093

(22) Filed: May 8, 2017

(65) Prior Publication Data
US 2018/0324062 A1    Nov. 8, 2018

(51) Int. Cl.
G06F 15/173    (2006.01)
H04L 29/08    (2006.01)
H04L 12/24    (2006.01)

(52) U.S. Cl.
CPC .......... H04L 67/10 (2013.01); H04L 41/0636 (2013.01); H04L 41/0816 (2013.01); H04L 41/0686 (2013.01); H04L 41/12 (2013.01)

(58) Field of Classification Search
CPC .. H04L 67/10; H04L 41/0636; H04L 41/0816
See application file for complete search history.

(56) References Cited

U.S. PATENT DOCUMENTS

| | | | |
|---|---|---|---|
| 6,393,386 B1 | 5/2002 | Zager et al. | |
| 8,260,907 B2 | 9/2012 | O'Sullivan | |
| 8,862,727 B2 | 10/2014 | Jayachandran et al. | |
| 2012/0054554 A1* | 3/2012 | Dagan | G06F 11/0712 714/39 |
| 2012/0159517 A1 | 6/2012 | Shen et al. | |
| 2014/0236515 A1 | 8/2014 | Ho et al. | |
| 2014/0281739 A1 | 9/2014 | Tuffs et al. | |

(Continued)

FOREIGN PATENT DOCUMENTS

WO    2013000079 A1    1/2013

OTHER PUBLICATIONS

Mell, Peter et al.; "The NIST Definition of Cloud Computing"; NIST National Institute of Standards and Technology; Special Publication 800-145; Sep. 2011; pp. 7.

(Continued)

*Primary Examiner* — Thanh T Nguyen
(74) *Attorney, Agent, or Firm* — Peter K. Suchecki

(57) ABSTRACT

A system, method and program product for managing incidents in a complex IT environment. A system is described that includes: a discovery module that analyzes an IT infrastructure and generates a topology of components and users; a monitoring module that compares ongoing activities of the IT infrastructure with a pattern repository to identify potential problems; a relationship manager that generates relationship maps of components and users based on the topology, determines whether an identified potential problem comprises an incident, and in response to detecting an incident: correlates the incident with a root cause, and determines a responsible admin and set of impacted users based on the relationship maps; and an operation engine that notifies the responsible admin and set of impacted users of the incident.

20 Claims, 11 Drawing Sheets

(56) References Cited

U.S. PATENT DOCUMENTS

| | | | | |
|---|---|---|---|---|
| 2015/0081885 | A1 | 3/2015 | Thomas et al. | |
| 2015/0222656 | A1* | 8/2015 | Haugsnes | G06F 16/24 |
| | | | | 726/23 |
| 2015/0317801 | A1* | 11/2015 | Bentley | H04N 7/181 |
| | | | | 382/107 |
| 2015/0318015 | A1* | 11/2015 | Bose | H04N 7/188 |
| | | | | 386/248 |
| 2015/0348591 | A1* | 12/2015 | Kaps | G11B 27/17 |
| | | | | 386/201 |
| 2016/0292509 | A1* | 10/2016 | Kaps | G06K 9/00718 |
| 2016/0292881 | A1* | 10/2016 | Bose | G06K 9/00342 |
| 2016/0322078 | A1* | 11/2016 | Bose | G11B 27/031 |
| 2017/0034001 | A1* | 2/2017 | Dagan | H04L 41/12 |
| 2017/0262697 | A1* | 9/2017 | Kaps | A63F 13/812 |

OTHER PUBLICATIONS

Sarkar, Soumitra et al.; "Automated Incident Management for a Platform-as-a-Service Cloud"; IBM T. J. Watson Research Center, New York; pp. 6.

Potharaju, Rahul et al.; "When the Network Crumbles: An Empirical Study of Cloud Network Failures and their Impact on Services"; SoCC '13; Oct. 1-3, 2013; Santa Clara, CA; Copyright 2013 by the Association for Computing Machinery, Inc.; pp. 16.

Xiong, Naixue et al.; "A Self-tuning Failure Detection Scheme for Cloud Computing Service"; 2012 IEEE 26th International Parallel and Distributed Processing Symposium; Copyright 2012 IEEE; pp. 668-679.

Adachi, Motomitsu et al.; "System Management and Operation for Cloud Computing Systems"; Fujitsu Sci. Tech. J.; vol. 45; No. 2; Apr. 2012; pp. 151-158.

\* cited by examiner

INCIDENT MANAGEMENT FOR COMPLEX INFORMATION TECHNOLOGY PLATFORMS

TECHNICAL FIELD

The subject matter of this invention relates to managing incidents in cloud environments, and more particularly to a platform for processing cloud based information to efficiently identify and notify relevant users and responsible administrators of cloud-based incidents.

BACKGROUND

As enterprises continue to seek more effective solutions for their information technology (IT) needs, the use of complex IT infrastructures such as cloud platforms have become more and more widespread. With the increase in demand, cloud technologies have been evolving at a very fast pace in which the underlying hardware infrastructure and software management platforms are becoming more diverse and complex. For example, Open Stack, which is an open-source software platform that controls diverse multi-vendor hardware resources, releases upgrades every several months in which new components and features are added. As part of the evolution, the software management complexity level is also increased.

In the current environment, when a cloud-based incident occurs, e.g., a component of the cloud hardware (e.g., a switch, storage, a server, etc.) malfunctions, or some cloud management services are down, most cloud vendors cannot efficiently identify the: exact service(s) involved, scope, impacted users, responsible cloud administrator and/or related operational stakeholders. Accordingly, a large amount of time and effort are wasted by cloud service administrators determining what component in the cloud environment requires repair, who the impacted users are, who is responsible to correct the malfunction, whether there are any known corrective actions, etc.

SUMMARY

Aspects of the disclosure provide a platform for processing cloud based information to efficiently identify and notify relevant users and responsible administrators of an incident.

A first aspect discloses an incident management system for a complex information technology (IT) infrastructure, comprising: a discovery module that analyzes an IT infrastructure and generates a topology of components and users; a monitoring module that compares ongoing activities of the IT infrastructure with a pattern repository to identify potential problems; a relationship manager that generates relationship maps of components and users based on the topology, determines whether an identified potential problem comprises an incident, and in response to detecting an incident: correlates the incident with a root cause, and determines a responsible admin and set of impacted users based on the relationship maps; and an operation engine that notifies the responsible admin and set of impacted users of the incident.

A second aspect discloses a computer program product stored on a computer readable storage medium, which when executed by a computing system, provides incident management for a complex information technology (IT) infrastructure, the program product comprising: program code that analyzes an IT infrastructure and generates a topology of components and users; program code that compares ongoing activities of the IT infrastructure with a pattern repository to identify potential problems; program code that generates relationship maps of components and users based on the topology, determines whether an identified potential problem comprises an incident, and in response to detecting an incident: correlates the incident with a root cause, and determines a responsible admin and set of impacted users based on the relationship maps; and program code that notifies the responsible admin and set of impacted users of the incident.

A third aspect discloses a computerized method that performs incident management for a complex information technology (IT) infrastructure, the method comprising: analyzing an IT infrastructure and generating a topology of components and users; comparing ongoing activities of the IT infrastructure with a pattern repository to identify potential problems; generating relationship maps of components and users based on the topology; determining whether an identified potential problem comprises an incident, and in response to detecting an incident: correlating the incident with a root cause, and determining a responsible admin and set of impacted users based on the relationship maps; and notifying the responsible admin and set of impacted users of the incident.

BRIEF DESCRIPTION OF THE DRAWINGS

These and other features of this invention will be more readily understood from the following detailed description of the various aspects of the invention taken in conjunction with the accompanying drawings in which.

Figure 1:
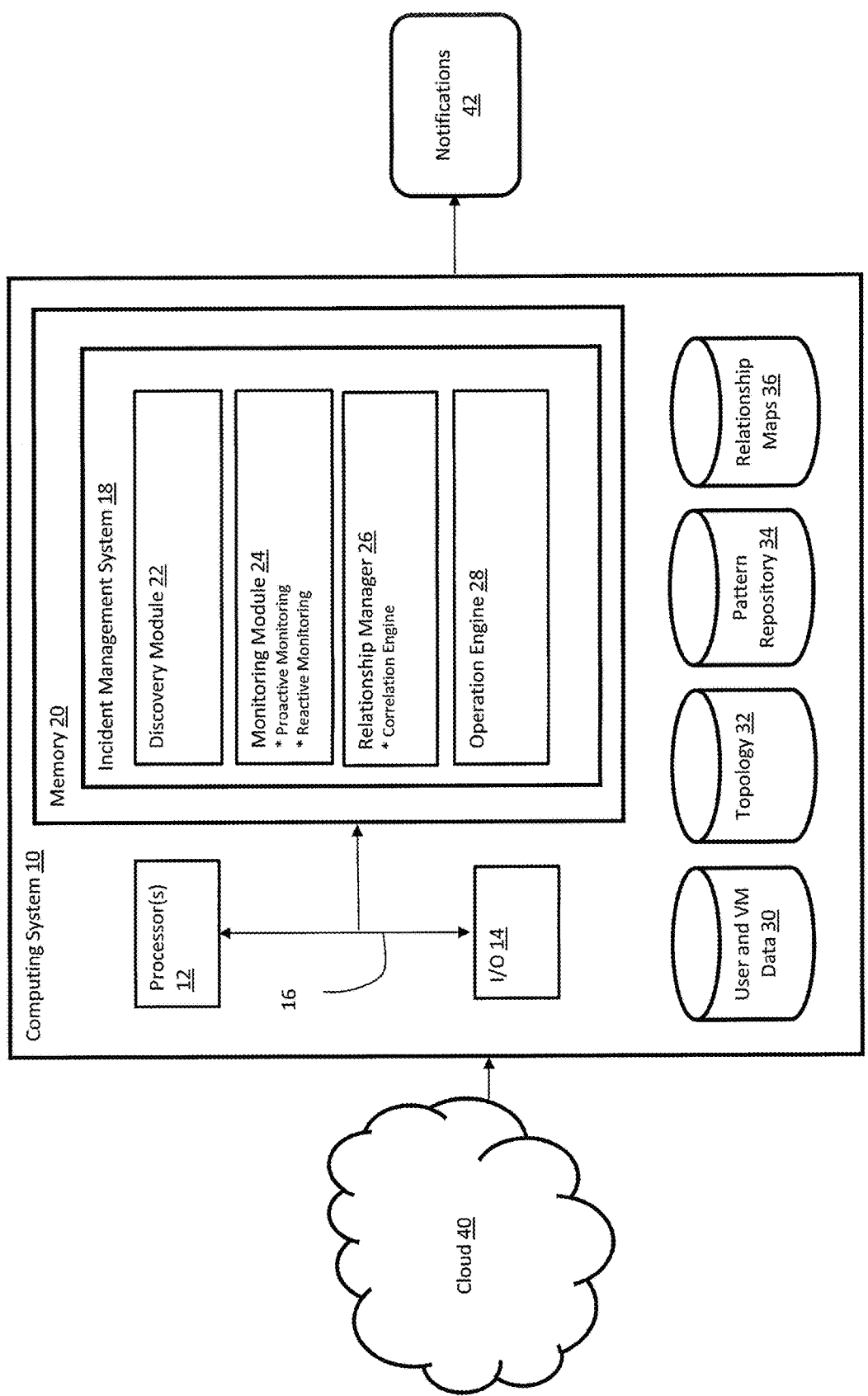
FIG. 1 shows a computing system having an incident management system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having an incident management system 18 for identifying and notifying relevant users and responsible administrators (admins) of an incident occurring in a cloud infrastructure (or simply "cloud") 40. For the purposes of this disclosure, the term "incident" may refer to any loss of service, predicted loss of service, security or policy breach, or predicted breach of any component of a cloud infrastructure 40. Cloud components may include any device or system that allows the cloud 40 to function, including hardware, software/services, virtual machines (VMs), network elements, etc. Note that the descriptions provided here are generally directed to Information as a Service (IaaS) or Platform as a Service (PaaS) cloud environments. However, it is understood that the approach may be employed for any cloud or complex information technology (IT) infrastructure.

Incident management system 18 generally includes: (1) a discovery module 22 that analyzes the cloud 40 to generate a topology 32 of the cloud 40 and collect user and VM data 30; (2) a monitoring module 24 that monitors ongoing operations within the cloud 40, updates the topology 32, and populates a pattern repository 34 of potentially problematic activities; (3) a relationship manager 26 that builds and maintains relationship maps 36 that link components with other components, users with components, and users with other users, and implements a correlation engine to identify root causes of detected incidents; and (4) an operation engine 28 that generates notifications 42 to impacted users and responsible administrators of a detected incident.

Figure 2:
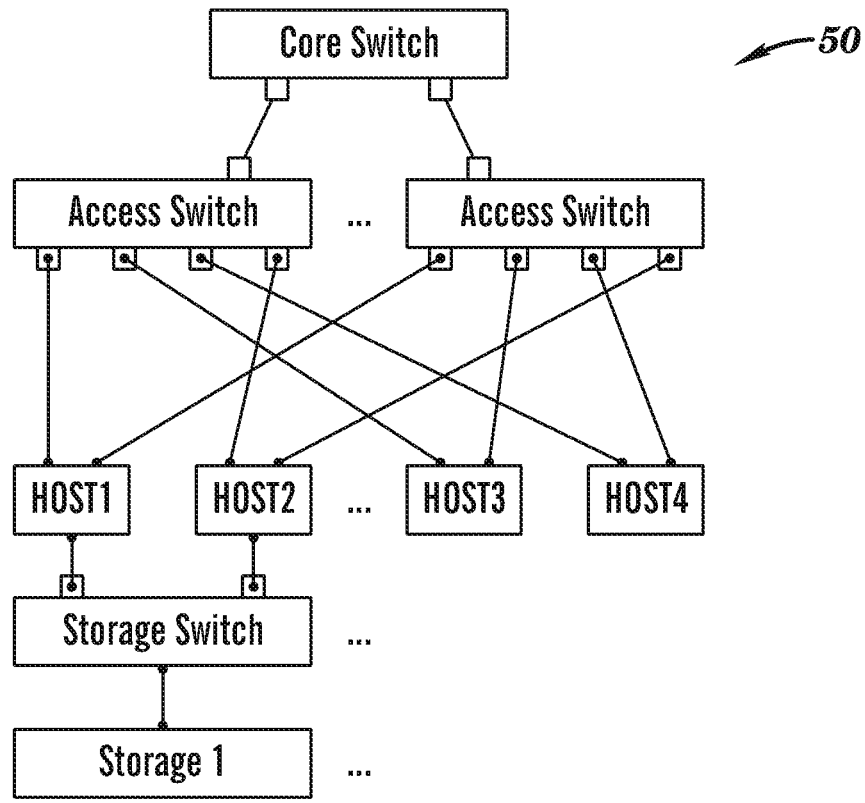
FIG. 2 shows hardware topologies according to embodiments.

Discovery module 22 may utilize any logic or system for building and maintaining various topologies (i.e., component topologies and user topologies) collectively referred to as topology 32. Topology 32 may be represented in any format, e.g., metadata, a graph, tables, etc. For example, a hardware topology 50 (FIG. 2) may be generated using discovery module 22 by periodically invoking a hypervisor SDK (software development kit), cloud API (application programming interface), or hardware management API to create a tree structure. Other component topologies, e.g., servers, switches, storage, etc., may be generated with an agent that cross-references different components and stores results in a table 52 (FIG. 2). Still further, the hypervisor SDK or cloud API may be used to generate VM components that break down VMs to constituent hardware parts, such as that shown in table 54 (FIG. 2). The same information may likewise be ascertained from port scans, monitoring tools, enterprise APIs, etc.

Figure 3:
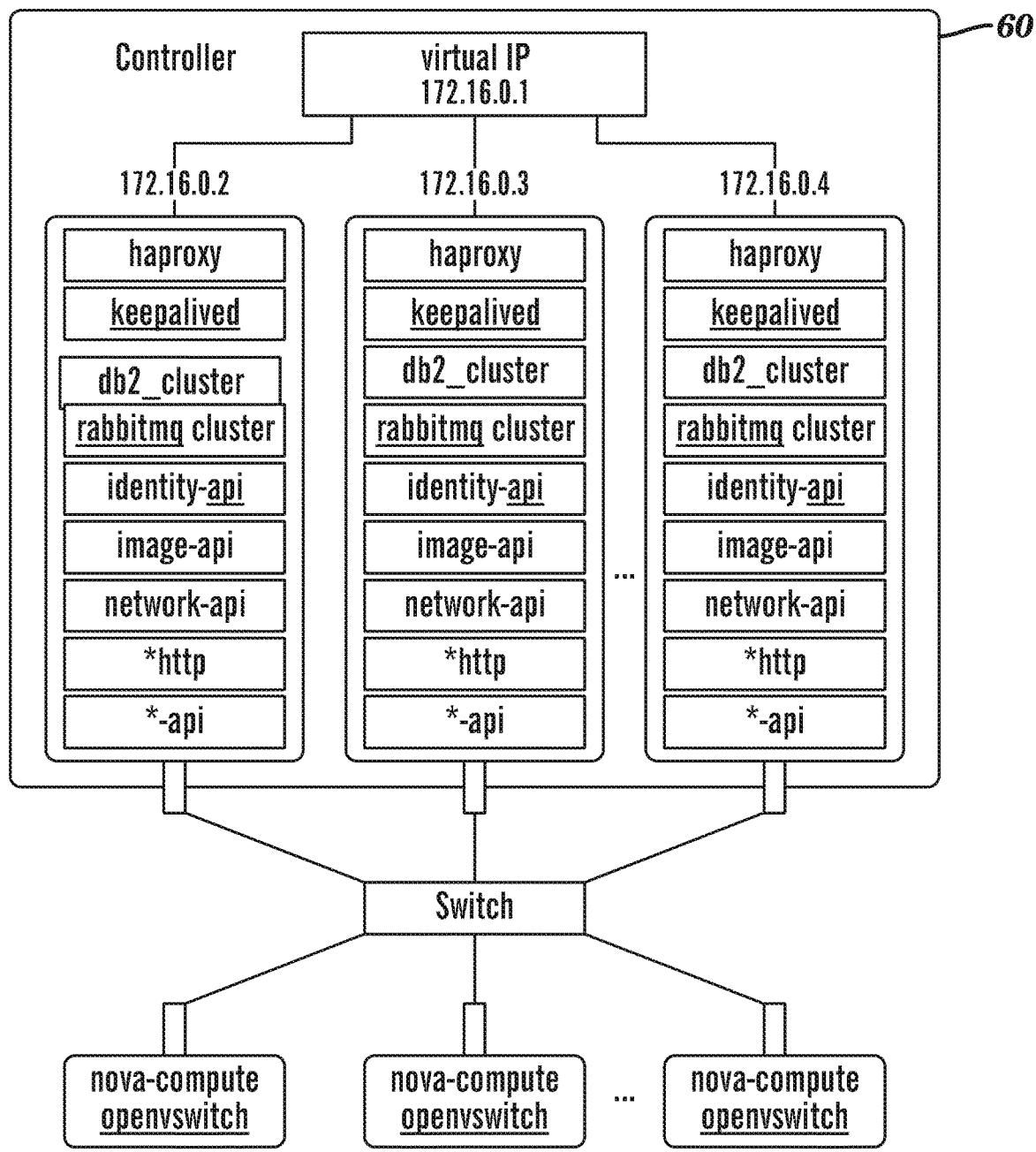
FIG. 3 shows a software/services topology according to embodiments.
Figure 4:
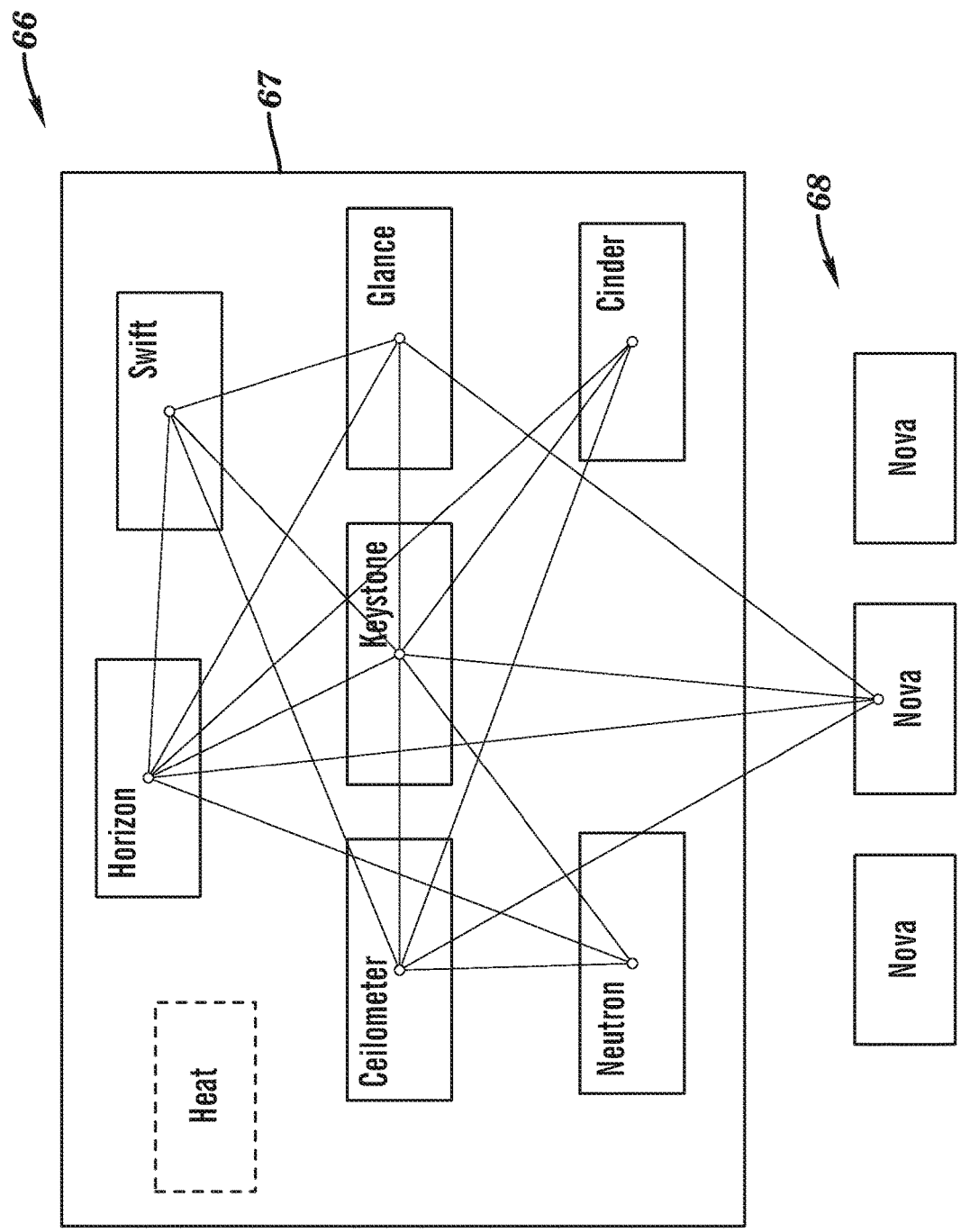
FIG. 4 shows a node based topology according to embodiments.

In addition, a software/services topology may also be generated by discovery module 22. For example, as shown in FIG. 3, a software/services tree 60 is shown for a controller/switch. Also shown is a table 62 that shows a VM and its associated cloud logic nodes. The software/services tree 60 may for example be generated with a cloud management API or cloud management commands. Further, based on the cloud hardware tree and software/services topology, a topology capturing the relationship between basic cloud management and computing nodes may be generated. An illustrative node representation 66 is shown in FIG. 4 that connects controller nodes 67 to compute nodes 68.

Figure 5:
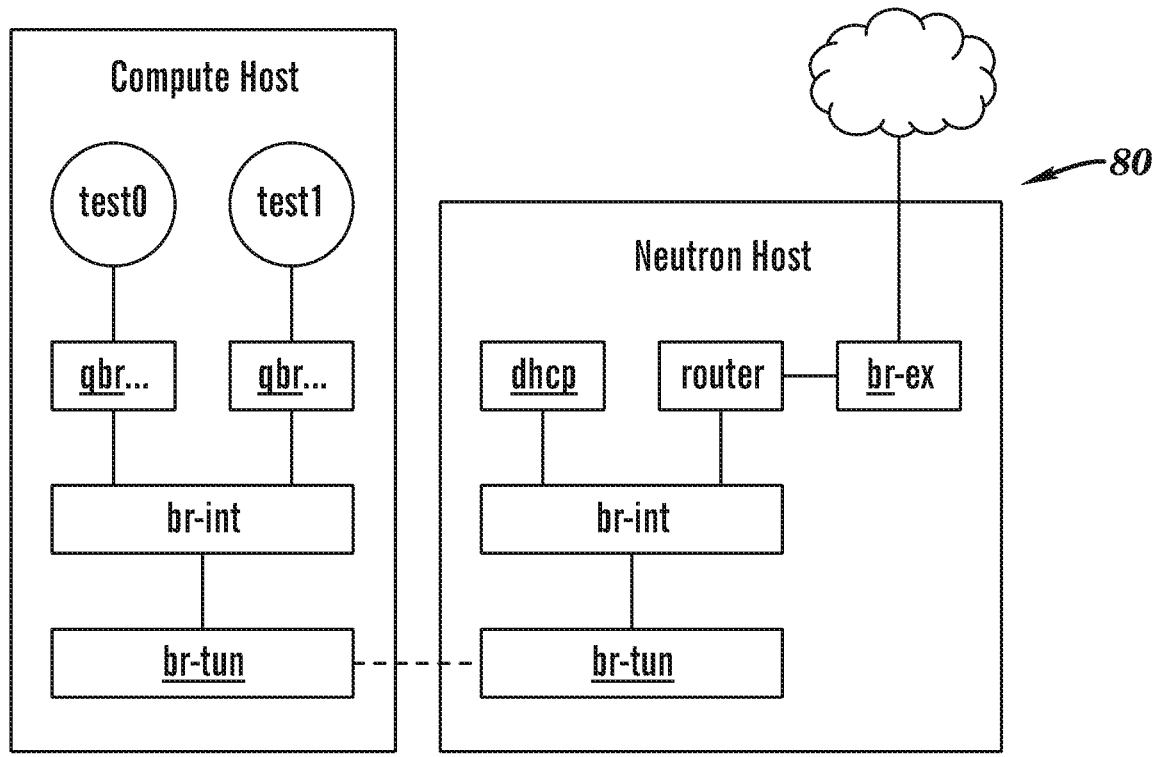
FIG. 5 shows a network topology according to embodiments.

In addition to hardware and software/services topologies 32, network logic topologies may also be generated by discovery module 22. FIG. 5 shows an illustrative network tree 80 involving a pair of hosts and their associated network configurations (bridges, routers, etc.). A table 82 depicting VM connections and associated network components is also shown in FIG. 5.

Figure 6:
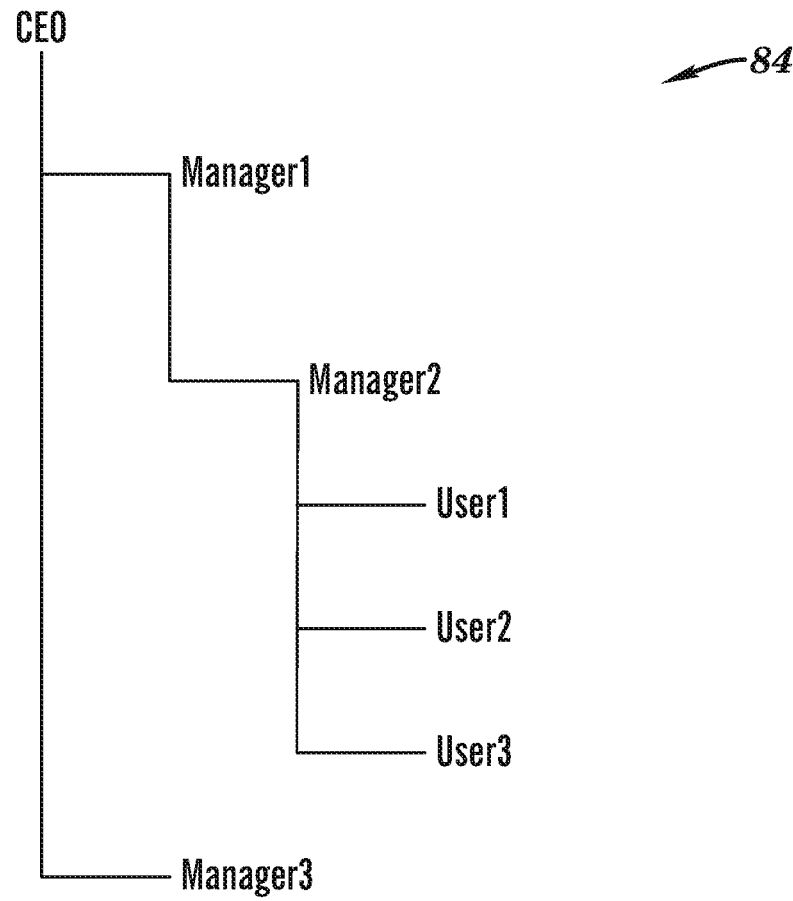
FIG. 6 shows a user topology according to embodiments.

In addition to hardware, software/services, and network logic topologies, user topologies may also be generated by discovery module 22. For example, an enterprise human resources API or cloud API may be employed to identify all users of the cloud 40, as well as related organizational hierarchies (e.g., for a private cloud). FIG. 6 depicts an illustrative user tree 84 and associated table 86 that shows relationships between users.

Once the overall topology 32 of the cloud 40 has been generated by discovery module 22 (FIG. 1), monitoring module 24 is employed to continuously monitor cloud activities. Monitoring may be done using any process, including, e.g., reviewing logs using operating system (OS) agents, performing port scans, utilizing application agents, profiling, etc. In one illustrative embodiment, monitoring module 24 may be employed to perform updates to the topology 32 when a change is detected, e.g., updating changes to hardware, services, VMs, updating changes of cloud users, etc.

Figure 7:
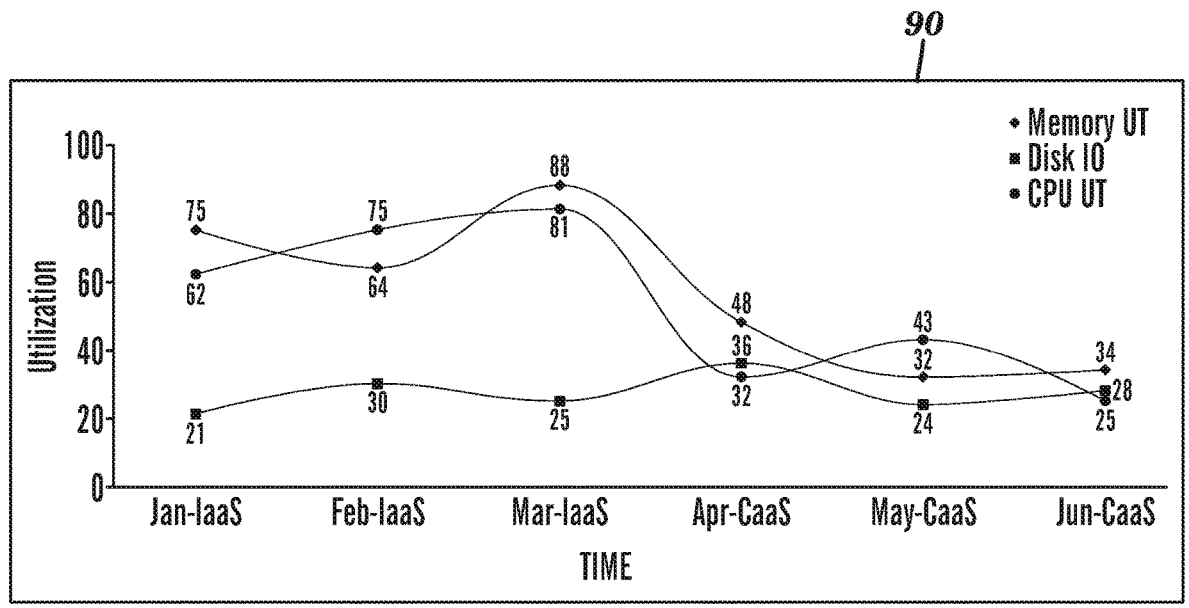
FIG. 7 shows monitoring information according to embodiments.

In addition, monitoring module 24 compares activities with patterns or thresholds stored in a pattern repository 34. Pattern repository 34 collects and stores potentially problematic activities of components identified in the topology 32, e.g., VMs, servers, switches, networks, services, users, etc. Thus for example, monitoring module 24 may collect utilization profiles of CPU usage, memory usage, disk I/O usage, such as that shown in plot 90 of FIG. 7, and compare the profiles to known patterns to determine if a potential issues exists. In a further embodiment, VM object and host activities 92, service activities 94, network activities 96, etc., may be stored in tabular form. The information may include various types of information, e.g., health status, operational status, busy/available status, etc., that can indicate potential or actual problematic activities, e.g., based on threshold values.

Monitoring module 24 compares current activities with the previously collected pattern information to detect potential problems, e.g., current incidents, predicted future incidents, problematic patterns involving hardware crashes, service failures, network breaches, overloads, etc. Accordingly, monitoring module 24 may employ proactive monitoring that uses data modeling and predictive analytic technologies to forecast utilization trends, malfunctions, etc. In this manner, predictive sets of data can be generated from the pattern repository 34, and the patterns and predictions can be refined through continuous learning. For example, each time a potential problem and resulting solution occurs, the associated activity data can be captured and stored as a pattern.

Furthermore, monitoring module 24 may employ reactive monitoring in which thresholds are established for different types of problems based on the topology 32, VM data, etc. The thresholds can then be used, e.g., to determine when an incident has occurred based on a current activity or behavior.

Relationship manager 26 (FIG. 1) has two primary functions, to generate and maintain relationship maps 36 and to implement a correlation engine. Relationship maps 36 link objects within the topology, such as relationships between VMs, users, hardware, services, etc. The relationship maps 36 map be generated based on the topology 32, VM data, user data, etc. For example, illustrative maps may determine which VMs are associated with which hosts, which VMs are associated with which network bridges, which VMs are associated with which users, etc. For example, a first VM (VM1) may have relationships with a host (HOST2), network bridge (BR1), and a set of users (USER1, USER5, USER7). Over time, relationship manager 26 may utilize information from the monitoring module 24 to implement real-time updates to the relationship maps 36. For example, if a server is added to the cloud 40, the topology 32 and associated relationship map 36 will be updated. In this manner, cloud users can be linked to components in the cloud 40, and different components can be linked.

Figure 8:
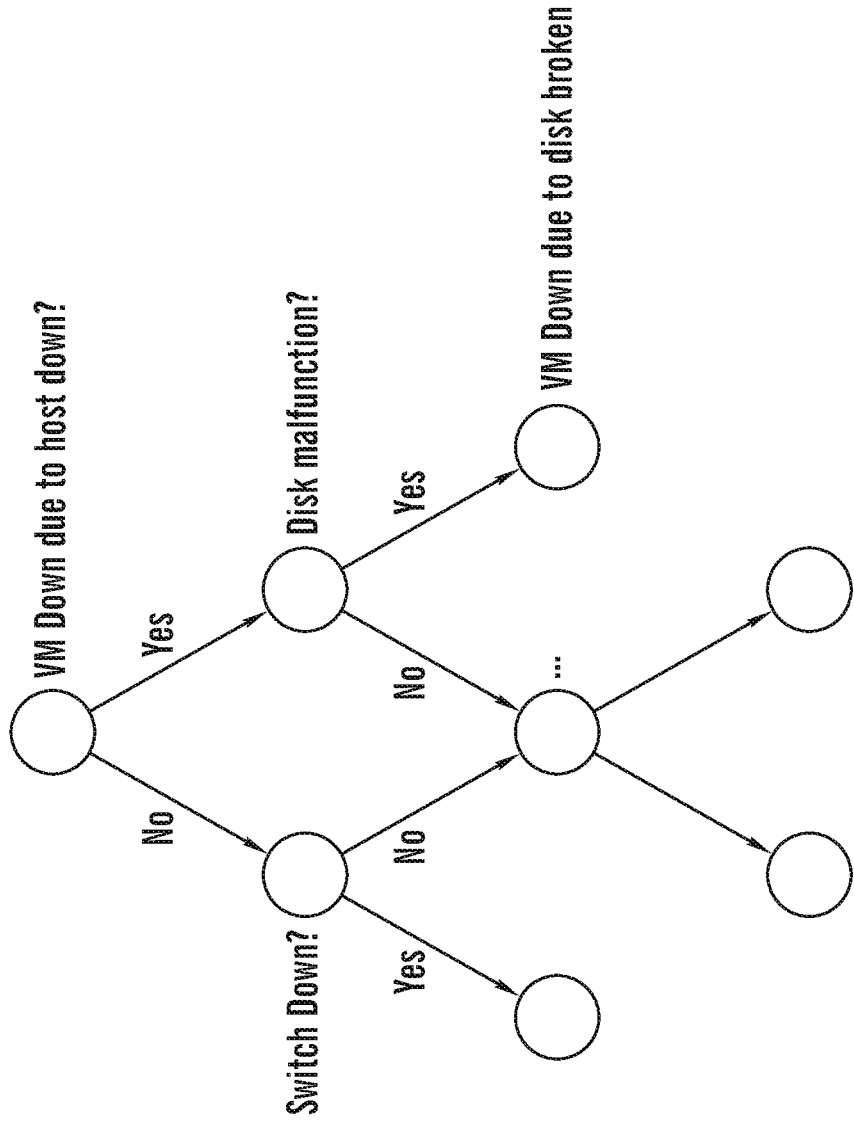
FIG. 8 shows a root cause binary tree according to embodiments.

The correlation engine provides a logical correlation between a detected potential problem or incident and a root cause based on the topology 32 and monitoring information stored in the pattern repository 34. In one illustrative embodiment, the correlation engine will employ a binary tree, such as that shown in FIG. 8. If a potential problem is detected (e.g., based on a pattern match or exceeded threshold value) the binary tree will determine a likely root cause. For example, if a VM is down, a predetermined binary tree (or similar logical rule set) will be utilized to ascertain whether the issue is an incident, and what is the root cause of the incident. For example, if a potential problem is flagged by the monitoring module 24, the relationship manager 26 will launch the correlation engine, make inquiries such determining whether the host is down, whether a switch or disk has malfunctioned, etc. Different binary trees may be provided and modeled after the logical steps a cloud admin would take to identify incidents and find a root cause. Although the process is intended to be automated, the cloud admin may manually interface with the correlation engine to assist in identifying the root cause.

Once the root cause is ascertained, the relationship maps 36 may be utilized to identify impacted users and admins associated with the root cause. For example, if the root cause is a bad disk on HOST1, the relationship maps 36 are analyzed to determine which users are associated with HOST1 and/or the bad disk and which admins are responsible the bad disk. The operation engine 28 can then be utilized to notify the appropriate entities (e.g., end users, admins, technicians, etc.).

An illustrative example is as follows. Assume a network switch port malfunctions, and the malfunction is detected by the monitoring module 24. The monitoring module 24 would then update the switch port's status (i.e., metadata) in the topology 32. In turn, the relationship manager 26 detects a change in the topology metadata (or is otherwise notified by the monitoring module 24), determines if the malfunction comprises an incident and if so determines a root cause. The relationship manager 26 then generates a list of impacted entities, e.g., a cloud VM list and a user list. The operation engine 28 then sends out notifications to the impacted entities.

Figure 9:
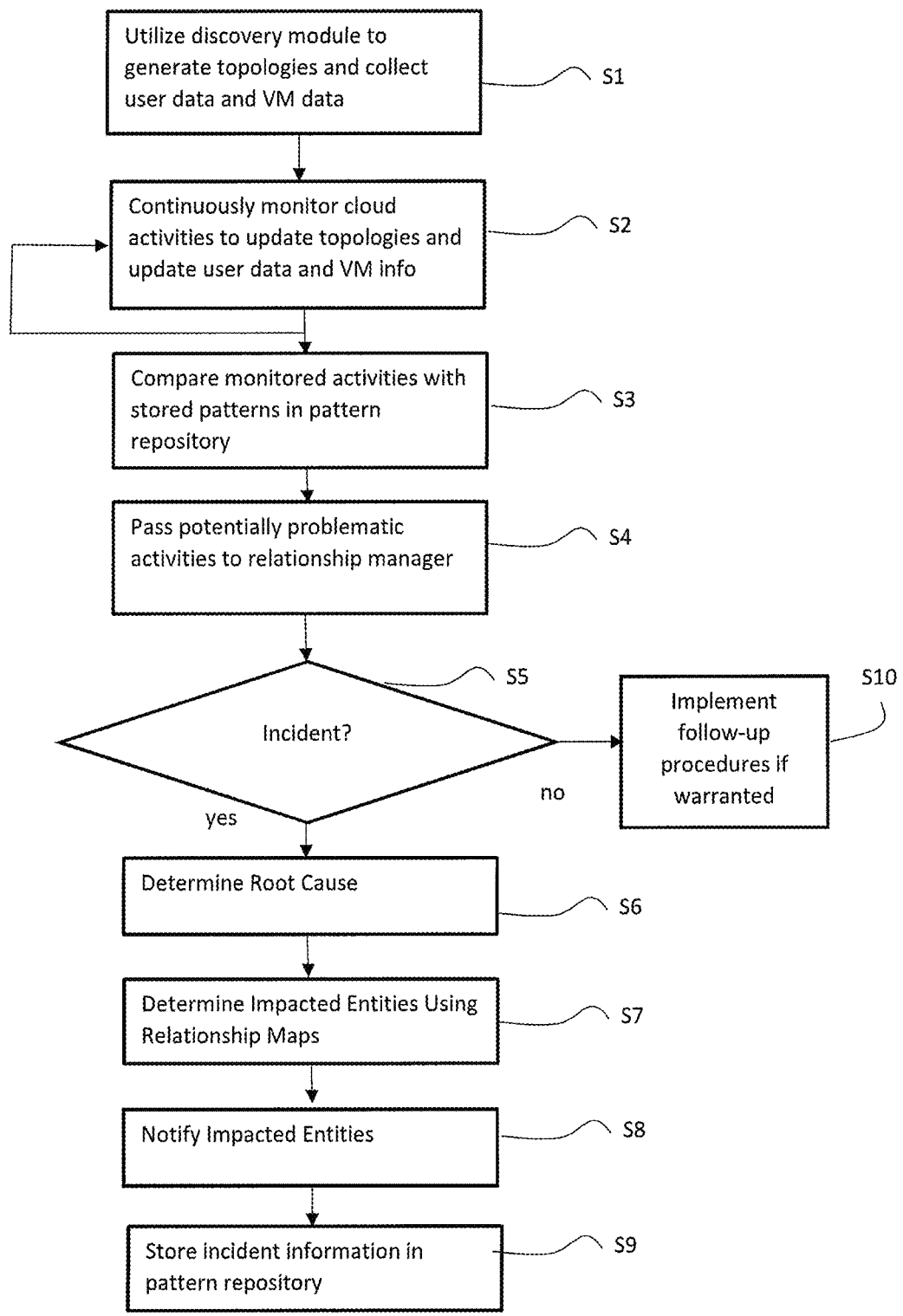
FIG. 9 a flow diagram of an incident management method according to embodiments.

FIG. 9 depicts a flow diagram of a method of implementing the incident management system of FIG. 1. At S1, discovery module 22 is utilized to generate topologies 32 and collect user and VM data 30. At S2, cloud activities are continuously monitored by monitoring module 24 to update topologies 32 and user and VM data 30. Next, at S3, monitored cloud activities are compared with stored patterns or thresholds in the pattern repository 34 and at S4 any potentially problematic activities are passed to the relationship manager 26. At S5, a determination is made whether the potential problem is an incident. If no, the relationship manager 26 can implement follow-up procedures if necessary (e.g., notifying a cloud admin, creating a log, etc.) at S10. If yes, the relationship manager 26 determines a root cause using e.g., a binary tree at S6. Next, all impacted entities (e.g., users, admins, technicians, etc.) are determined based on relationship maps 36 at S7, and at S8 the impacted entities are notified. Finally, at S9, the incident information, e.g., logs, root cause, entities, cloud activities, etc., are stored in the pattern repository 34.

It is understood that incident management system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the incident management system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

It is understood that although this disclosure includes a detailed description that may be utilized to provide cloud-based computing services, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 10:
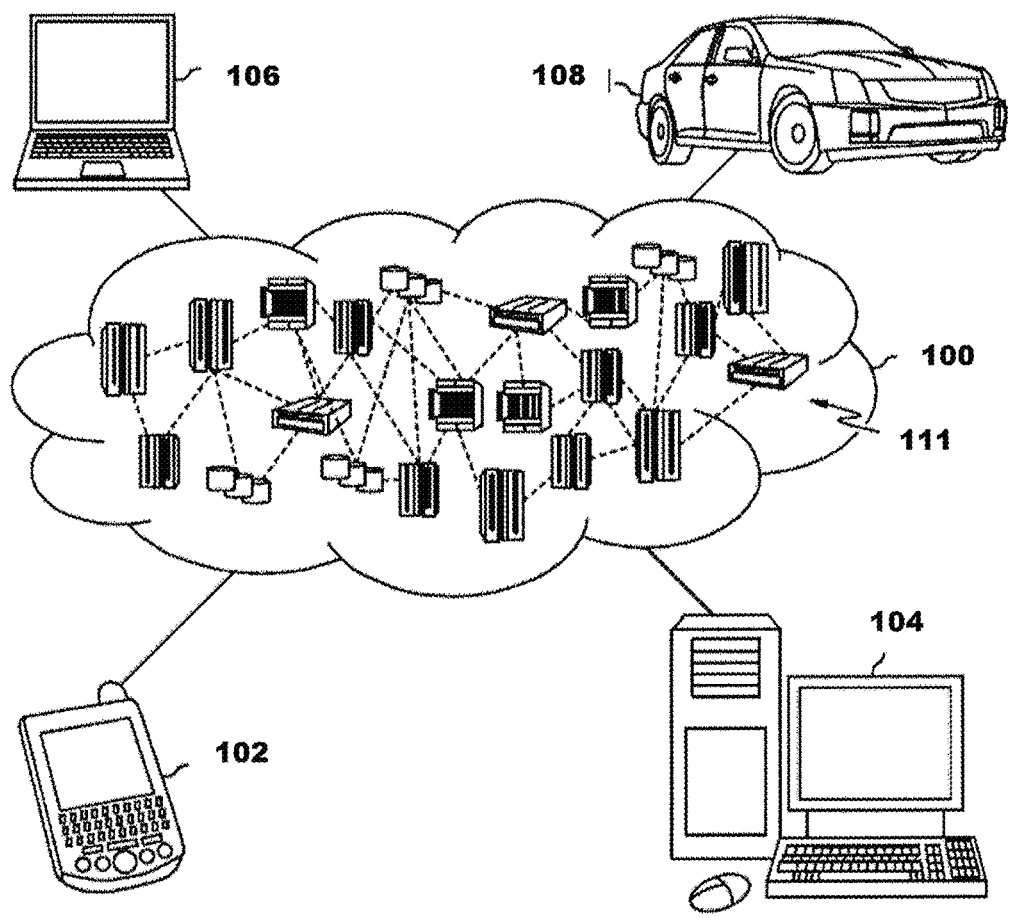
FIG. 10 shows a cloud infrastructure according to embodiments.

A cloud computing environment is service oriented with a focus on statelessness, low coupling, modularity, and semantic interoperability. At the heart of cloud computing is an infrastructure comprising a network of interconnected nodes. Referring now to FIG. 10, illustrative cloud computing environment 100 is depicted. As shown, cloud computing environment 100 comprises one or more cloud computing nodes 111 with which local computing devices used by cloud consumers, such as, for example, personal digital assistant (PDA) or cellular telephone 102, desktop computer 104, laptop computer 106, and/or automobile computer system 108 may communicate. Nodes 111 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device.

It is understood that the types of computing devices shown in FIG. 10 are intended to be illustrative only and that computing nodes 111 and cloud computing environment 100 can communicate with any type of computerized device over any type of network and/or network addressable connection (e.g., using a web browser).

Figure 11:
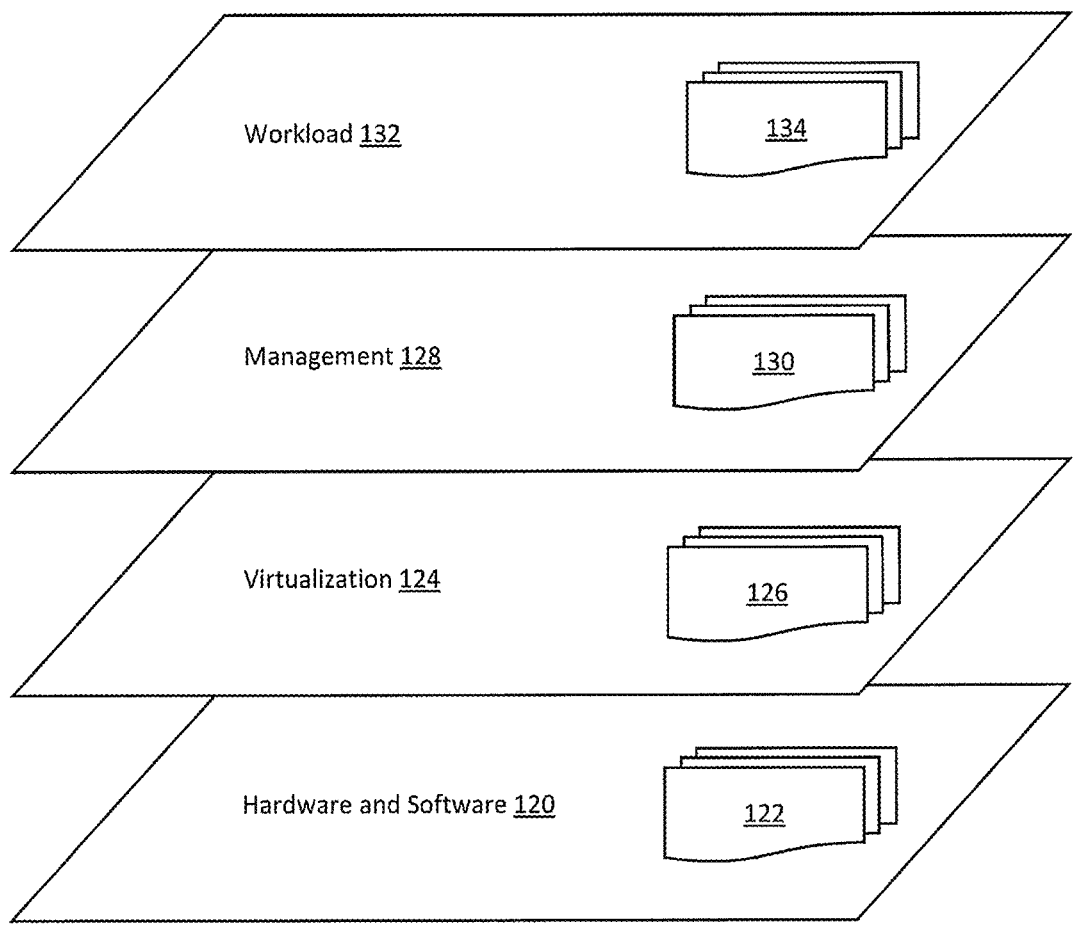
FIG. 11 shows a diagram of cloud layers according to embodiments.

Referring now to FIG. 11, a set of functional abstraction layers provided by cloud computing environment 100 (FIG. 10) is shown. It should be understood in advance that the components, layers, and functions shown in FIG. 11 are intended to be illustrative only and embodiments of the invention are not limited thereto. As depicted, the following layers and corresponding functions are provided: Hardware and software layer 120 includes hardware and software components 122. Examples of hardware components include: mainframes; RISC (Reduced Instruction Set Computer) architecture based servers; servers; blade servers; storage devices; and networks and networking components. In some embodiments, software components include network application server software and database software.

Virtualization layer 124 provides an abstraction layer from which the following examples of virtual entities 126 may be provided: virtual servers; virtual storage; virtual networks, including virtual private networks; virtual applications and operating systems; and virtual clients. In one example, management layer 128 may provide various functions 130 as e.g., described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators.

Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Workloads layer 132 provides various functionality 134 for which the cloud computing environment may be utilized. Examples of workloads and functions which may be provided from this layer include: mapping and navigation; software development and lifecycle management; virtual classroom education delivery; data analytics processing; transaction processing; and e.g., case DRaaS.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. An incident management system for a complex information technology (IT) infrastructure, comprising:
    a discovery module that analyzes an IT infrastructure and generates a topology of components and users;
    a monitoring module that compares ongoing activities of the IT infrastructure with a pattern repository to identify potential problems, including comparing a result from a proactive modeling based on at least one predictive analytic technology with the pattern repository;

a relationship manager that generates relationship maps of components and users based on the topology, determines whether an identified potential problem comprises an incident, and in response to detecting an incident:

correlates the incident with a root cause, and determines a responsible admin and set of impacted users based on the relationship maps; and an operation engine that notifies the responsible admin and set of impacted users of the incident.

2. The incident management system of claim 1, wherein the topology includes a user topology and at least one component topology, where the at least one component topology is selected from a group of a hardware topology, a software/services topology, and a network topology.

3. The incident management system of claim 2, wherein the relationship maps include a mapping between users and components.

4. The incident management system of claim 1, wherein the incident comprises one of a current loss of cloud services or a predicted loss of cloud services.

5. The incident management system of claim 1, wherein the root cause is determined with a binary tree.

6. The incident management system of claim 1, wherein the monitoring module updates the topology when a change in the infrastructure is detected.

7. The incident management system of claim 1, wherein the pattern repository is updated after the incident is detected and root cause is determined.

8. A computer program product stored on a computer readable storage medium, which when executed by a computing system, provides incident management for a complex information technology (IT) infrastructure, the program product comprising:

program code that analyzes an IT infrastructure and generates a topology of components and users;

program code that compares ongoing activities of the IT infrastructure with a pattern repository to identify potential problems, including comparing a result from a proactive modeling based on at least one predictive analytic technology with the pattern repository;

program code that generates relationship maps of components and users based on the topology, determines whether an identified potential problem comprises an incident, and in response to detecting an incident:

correlates the incident with a root cause, and determines a responsible admin and set of impacted users based on the relationship maps; and program code that notifies the responsible admin and set of impacted users of the incident.

9. The program product of claim 8, wherein the topology includes a user topology and at least one component topology, where the at least one component topology is selected from a group of a hardware topology, a software/services topology, and a network topology.

10. The program product of claim 9, wherein the relationship maps include a mapping between users and components.

11. The program product of claim 8, wherein the incident comprises one of a current loss of cloud services or a predicted loss of cloud services.

12. The program product of claim 8, wherein the root cause is determined with a binary tree.

13. The program product of claim 8, further comprising program code that updates the topology when a change in the infrastructure is detected.

14. The program product of claim 8, wherein the pattern repository is updated after the incident is detected and root cause is determined.

15. A computerized method that performs incident management for a complex information technology (IT) infrastructure, the method comprising:

analyzing an IT infrastructure and generating a topology of components and users;

comparing ongoing activities of the IT infrastructure with a pattern repository to identify potential problems, including comparing a result from a proactive modeling based on at least one predictive analytic technology with the pattern repository;

generating relationship maps of components and users based on the topology;

determining whether an identified potential problem comprises an incident, and in response to detecting an incident:

correlating the incident with a root cause, and determining a responsible admin and set of impacted users based on the relationship maps; and notifying the responsible admin and set of impacted users of the incident.

16. The method of claim 15, wherein the topology includes a user topology and at least one component topology, where the at least one component topology is selected from a group of a hardware topology, a software/services topology, and a network topology.

17. The method of claim 15, wherein the relationship maps include a mapping between users and components.

18. The method of claim 15, wherein the incident comprises one of a current loss of cloud services or a predicted loss of cloud services.

19. The method of claim 15, wherein the root cause is determined with a binary tree.

20. The method of claim 15, further comprising updating the topology when a change in the infrastructure is detected.

* * * * *